(12) United States Patent
Sutton et al.

(10) Patent No.: US 6,600,931 B2
(45) Date of Patent: Jul. 29, 2003

(54) ANTENNA SWITCH ASSEMBLY, AND ASSOCIATED METHOD, FOR A RADIO COMMUNICATION STATION

(75) Inventors: Gregory Sutton, San Diego, CA (US); Kevin Li, San Diego, CA (US); Robert Mix, San Diego, CA (US); Lanh Trinh, Carlsbad, CA (US)

(73) Assignee: Nokia Corporation, Espoo (FI)

( * ) Notice: Subject to any disclaimer, the term of this patent is extended or adjusted under 35 U.S.C. 154(b) by 36 days.

(21) Appl. No.: 09/823,017

(22) Filed: Mar. 30, 2001

(65) Prior Publication Data

US 2002/0142796 A1 Oct. 3, 2002

(51) Int. Cl.⁷ .................................................. H04B 1/38
(52) U.S. Cl. ........................ 455/552; 455/553; 455/78; 455/426
(58) Field of Search ................................. 455/552, 426, 455/432, 436, 277.1, 277.2, 273, 278.1, 272, 553, 83, 78

(56) References Cited

U.S. PATENT DOCUMENTS

| | | | | |
|---|---|---|---|---|
| 5,768,691 A | * | 6/1998 | Matero et al. ................ | 455/78 |
| 5,878,332 A | * | 3/1999 | Wang et al. .................. | 455/84 |
| 6,049,705 A | * | 4/2000 | Xue ........................ | 455/277.1 |
| 6,072,993 A | * | 6/2000 | Trikha et al. ................. | 455/78 |
| 6,256,495 B1 | * | 7/2001 | Francisco et al. ........... | 455/426 |
| 6,351,628 B1 | * | 2/2002 | Leizerovich et al. .......... | 455/83 |
| 6,393,279 B1 | * | 5/2002 | Lee ............................ | 455/426 |
| 6,535,748 B1 | * | 3/2003 | Vuorio et al. ................ | 455/552 |

* cited by examiner

*Primary Examiner*—Dwayne Bost
*Assistant Examiner*—Joy Contee
(74) *Attorney, Agent, or Firm*—Milan I. Patel

(57) ABSTRACT

A switch assembly, and an associated method, for a multi-mode mobile station operable to communicate pursuant to two or more communication services. Selected antenna transducers, or test ports, are selectably connected by way of the switch assembly to selected portions of the radio circuitry of the multi-mode mobile station. Non-mechanical switching is effectuated, thereby to provide appropriate connections of appropriate portions of the radio circuitry with the antenna transducers, or test ports, of the multi-mode mobile station.

18 Claims, 3 Drawing Sheets

| State | line1 (72) | line2 (74) | Active PCS Path | Active Cell Path | Load Active |
|---|---|---|---|---|---|
| 1 | 0 | 0 | ANT1 | ANT3 | YES |
| 2 | 0 | 1 | ANT2 | ANT3 | NO |
| 3 | 1 | 0 | ANT3 | ANT1 | YES |
| 4 | 1 | 1 | ANT3 | ANT2 | NO |

116

ANTENNA SWITCH ASSEMBLY, AND ASSOCIATED METHOD, FOR A RADIO COMMUNICATION STATION

The present invention relates generally to a manner by which selectably to connect transducer ports to radio circuitry of a communication station, such as a multi-mode mobile station operable pursuant to two or more radio communication systems. More particularly, the present invention relates to a switch assembly, and an associated method, by which selectably to connect a selected antenna transducer, such as a whip antenna or a patch antenna, to selected portions of the radio circuitry of the communication station. The switch assembly provides reliable and non-mechanical switching functions to selectably interconnect one or more antenna transducers with the selected portions of the radio circuitry. Selection of which antenna transducer, or other RF (radio frequency) coupling, to connect to which portion of the radio circuitry is dependent upon, for instance, in which mode that the communication station is being used. Two, or more, separate antenna transducers, or test points, can be connected, separately, to separate portions of the radio circuitry.

BACKGROUND OF THE INVENTION

Advancements in communication technologies have permitted the implementation, and widespread usage, of multi-user radio communication systems. A cellular communication system is exemplary of such a radio communication system. Information signals generated during operation of a radio communication system are transmitted upon radio communication channels defined upon portions of the electromagnetic spectrum. When transmitted upon radio communication channels, the information signal is in electromagnetic form. Regulatory bodies allocate portions of the electromagnetic spectrum for communications in various communication systems.

A radio transmitter forms the information signals which are to be transmitted to a radio receiver by way of a radio communication channel. Data which is to be communicated by the transmitter to the receiver is converted into a form to permit its communication upon the radio communication channel. Namely, a process, referred to as modulation, is performed. In a modulation process, the data is modulated together with a carrier wave to form the information signal. The carrier wave is of a frequency corresponding to the radio communication channel such that the resultant, information signal is of frequency characteristics to be communicated upon the communication channel.

The radio receiver which operates to receive the information signal includes circuitry to permit the data contained in the information signal to be extracted from the information signal. A process, generally reverse to the process by which the information signal is formed, and referred to as demodulation, is performed. In a demodulation process, the information signal received at the radio receiver is down-converted in frequency, and the data contained in the information signal is recovered.

Both the radio transmitter and the radio receiver include antenna transducers for transducing the information signal in to, and out of, the electromagnetic form. That is to say, when the radio transmitter performs the modulation process, the data is modulated together with the carrier wave to form the information signal in electrical form. The information signal, in electrical form, is applied to the antenna transducer, and the antenna transducer transduces the information signal into electromagnetic form for transmission upon the radio communication channel. When the information signal is received at the radio receiver, an antenna transducer forming a portion of the radio receiver converts the information signal, in electromagnetic form, into electrical form. Once converted into electrical form, the demodulation process is performed, and the data is recovered.

A radio transceiver is a radio communication device which includes both radio transmitter and radio receiver circuitry. Both sending and receiving operations are performed by the radio transceiver, thereby to permit two-way communications between the radio transceiver and another radio transceiver.

An antenna transducer, common to both the radio transmitter portion and the radio receiver portion both transduces information signals to be sent by the transmitter portion of the transceiver and also the information signals received at the radio transceiver, thereafter to be applied to the receiver portion of the radio transceiver.

Various different types of antenna transducer constructions are utilized to form portions of a radio transceiver. A mobile station utilized in a cellular communication system, sometimes includes a whip antenna. A whip antenna is typically formed of, or includes, a dipole antenna which is translatable between a retracted position and an extracted position. Mobile stations sometimes alternately, or additionally, utilize patch antennas, usually positioned within a housing of the mobile station. Mobile stations sometimes utilize other types of antenna transducers, such as PIFA (planar inverted F antennas), or other antenna transducer-types.

Various cellular communication system standards have been developed, and existing cellular communication systems are constructed, pursuant to such standards. And, various, new proposed standards have been set forth pursuant to which additional cellular communication systems are to be constructed. Various of the standards which define various ones of the cellular communication systems are operable in different manners and require different apparatus, at both the network infrastructure of such systems, as well as also at the mobile stations operable therein.

Various mobile stations have been constructed to be operable in more than one cellular communication system. Dual-mode mobile stations, for instance, are available, and permit a user to communicate alternately by way of two different cellular, or other radio, communication systems. Tri-mode mobile stations, analogously, are available and permit a user to communicate alternately by way of three different communication systems. More generally, multi-mode mobile stations have been developed to permit their operation in multiple different types of cellular communication systems.

A multi-mode mobile station typically must include circuitry specifically constructed for each of the different cellular communication systems in which the mobile station is operable. Because signals generated and received pursuant to operation of the different cellular communication systems are formed, variously, at different frequency ranges and with different modulation schemes, separate circuitry specific to the different communication systems is required to form portions of the multi-mode mobile stations.

The type of antenna transducer to be used to transduce information signals generated at, or received at, the mobile station might be desired to be dependent upon the mode in which the mobile station is operated. And, if the mobile station includes more than one type of antenna transducer, one, or another, of the antenna transducers might be selected responsive to changeable characteristics of one of the antenna transducers. For instance, when one of the antenna transducers is formed of a whip antenna translatable between extracted and retracted positions, use of the whip antenna transducer might be preferred when positioned in the extracted position, but not when in the retracted position.

Switching circuitry is required to switch between the different antenna transducer types with the separate circuitry portions of the multi-mode mobile station. Conventional switching elements, however, exhibit various problems. For instance, mechanical switches sometimes exhibit reliability problems as well as unwanted coupling between separate antenna transducers. Additionally, tri-mode mobile stations which use conventional switching apparatus require the use of a diplexer.

Improved switch apparatus of improved levels of reliability, lessened amounts of coupling, and which obviates the need of use of a diplexer would therefore be advantageous.

It is in light of this background information related to radio communication stations that the significant improvements of the present invention have evolved.

SUMMARY OF THE INVENTION

The present invention, accordingly, advantageously provides apparatus, and an associated method, by which selectably to connect transducer ports to radio circuitry of a communication station, such as a multi-mode mobile station operable pursuant to two or more radio communication systems.

In operation of an embodiment of the present invention, a switch assembly is utilized by which selectably to connect a selected antenna transducer, such as a whip antenna or a patch antenna, to selected portions of the radio circuitry of the communication station. The assembly is implementable in monolithic, hybrid, discrete, mechanical, electro-mechanical, or other, form as well as combinations thereof.

Non-mechanical switching operations are performed to selectably interconnect one or more antenna transducers, or other RF (radio frequency) couplings, to a selected portion of the circuitry of the multi-mode mobile station. Selection of which antenna transducer, or other RF coupling, to connect to which portion of the mobile station circuitry is dependent, for instance, upon in which mode the mobile station is being used and the characteristics of the antenna transducer, such as whether a whip antenna is positioned in an extracted or retracted position.

In one aspect of the present invention, a multiple-connector switch assembly is provided for a multi-mode communication station, such as a multi-mode mobile station operable to communicate pursuant to two or more communication systems. The multi-mode switch assembly provides non-mechanical switching to connect selected antenna transducers, or other RF couplings, to separate radio circuitry portions of the multi-mode communication station. Improved reliability in contrast to conventional mechanical switch mechanisms is possible due to the non-mechanical construction of the switch assembly. Additionally, when the switch assembly is utilized to form a portion of a tri-mode communication station, the conventional requirement that a diplexer be used is obviated. The construction costs of a communication station including the switch assembly is reduced and cost associated with assembling the communication station to include the switch assembly are analogously also reduced.

In another aspect of the present invention, when the switch assembly is utilized to connect two or more antenna transducers to the radio circuitry of the communication station, unwanted coupling between the antenna transducers is reduced. A switch element forming a portion of the switch assembly is used to selectably detune one of the antenna transducers, thereby to reduce the RF coupling with an other of the antenna transducers. Performance of the communication station is, as a result, improved relative to a communication station in which detuning is not performed.

In one implementation, an antenna switch assembly is provided for a tri-mode mobile station. When operated in a first mode, the mobile station is operable to communicate pursuant to a conventional analog AMPS (advanced mobile phone service) cellular service operable in the 800 MHz range. When operated in a second mode, the mobile station is operable to communicate pursuant to a cellular band, i.e., 800 MHz, CDMA (code-division multiple-access) communication service. And, when the mobile station is operated in a third mode, the mobile station is operable to communicate pursuant to a PCS (personal communication services)—band, i.e., 1.9 GHz, frequency, CDMA service. The antenna switch assembly selectably connects a whip antenna transducer, a patch antenna transducer, and up RF (radio frequency) connector to selected portions of the circuitry of the multi-mode mobile station. The RF connector is connectable, for instance, to apparatus sometimes referred to as a "car kit" used for RF testing purposes. The switch assembly connects any selected antenna transducer or RF connector with any portion of the multi-mode mobile station. Switching operations are performed immediately, without the need for mechanical switch elements. In one implementation, the switch elements of the switch assembly are formed of transistor switches. In another implementation, the switch elements of the switch assembly are formed of mix switches.

In these and other aspects, therefore, apparatus, and an associated method, is provided for a communication station having first circuitry operable to communicate pursuant to a first communication system and at least second circuitry operable to communicate pursuant to a second communication system. An electronic switch assembly switchingly connects a selected one of a first antenna transducer port and at least a second antenna transducer port with a selected one of the first circuitry and at least second circuitry. A first switch element set is coupled to the first antenna transducer port, to the first circuitry, and to the second circuitry. The first switch element set is selectably operable to connect the first antenna transducer port to a selected one, if any, of the first circuitry and the at least second circuitry. A second switch element set is coupled to the second antenna transducer port, to the first circuitry, and the at least the second circuitry. The second switch element set is selectably operable to connect the second antenna transducer port to a selected one, if any, of the first circuitry and the at least the second circuitry. A controller is coupled to the first switch element set and to the second switch element set. The controller controls positioning of the first switch element set and the second switch element set.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION

Figure 1:
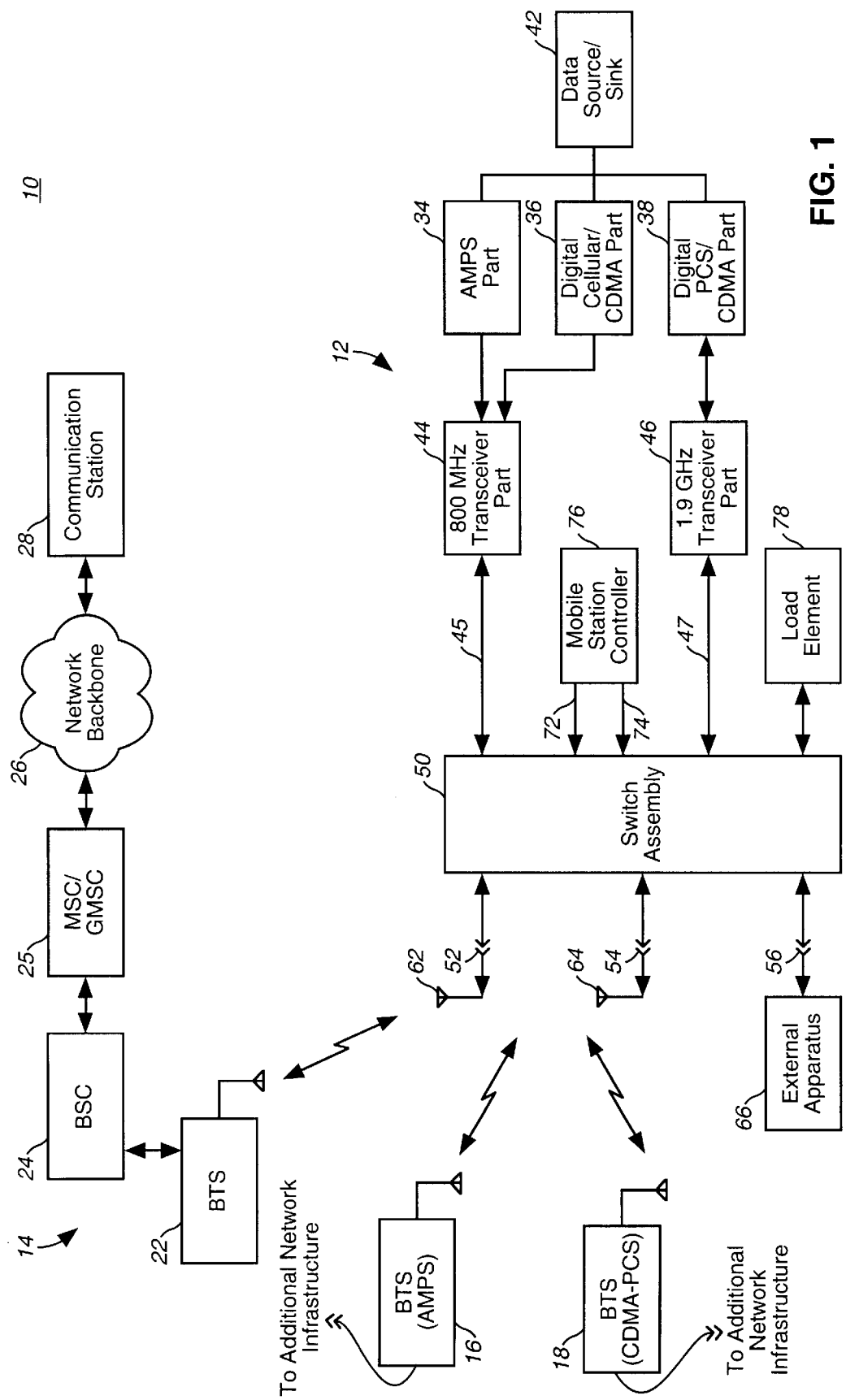
FIG. 1 illustrates a functional block diagram of a communication system in which an embodiment of the present invention is operable.

Referring first to FIG. 1, a communication system, showing generally a 10, provides for radio communications with a mobile station 12 by way of radio links formed with the mobile station. In the exemplary implementation, the mobile station 12 forms a dual-band, tri-mode, cellular mobile station selectably operable in three separate mobile communication systems. While the following description shall describe the mobile station 12 with respect to such an implementation, it should be understood that other embodiments of the present invention can analogously be implemented to be operable in other types of communication systems.

Three separate network infrastructures, a first network infrastructure 14, a second network infrastructure 16, and a third network infrastructure 18, are installed and are permitting of radio communications with the mobile station 12 when the mobile station is positioned in a geographical area encompassed by the network infrastructure of the respective communication systems. The separate network infrastructures may be overlaid, or partially overlaid, upon one another. Or, the network infrastructure may be installed at separate geographical areas, and the mobile station communicates with the respective ones of the separate radio communication systems when the mobile station is positioned in the geographical area encompassed by such respective communication systems.

The network infrastructure 14 here is representative of a cellular-band, CDMA (code-division, multi-access) mobile communication system operable at approximately 800 MHz. The network infrastructure 16 is representative of a cellular-band, AMPS (advanced mobile phone service) mobile communication system also operable at approximately 800 MHz. And, the network infrastructure 18 is representative of the network infrastructure of a PCS-band, CDMA mobile communication system operable at approximately 1.9 GHz.

The network structure 14 is here shown to include a base transceiver station 22, which is operable to transceive radio-frequency, information signals with the mobile station 12. The base transceiver station is coupled to a base station controller (BSC) 24. The base station controller is operable to control operation of the base transceiver station. The base station controller is, in turn, coupled to a mobile switching center (MSC) 25. The switching center 25 performs switching operations and is coupled to a network backbone 26, such as a public-switched telephonic network. Remote communication stations, such as the communication station 28, are coupled to the network backbone. A communication path is formable between the communication station 28 and the mobile station 12 to permit communications therebetween. While not separately shown, the network infrastructure 16 and 18 includes analogous structure to that shown with respect to the network infrastructure 14.

The mobile station 12 forms a radio transceiver having radio circuitry for generating and receiving information signals generated during operation of the communication system 10. The radio circuitry includes both radio transmitter circuitry and radio receiver circuitry, selectably to permit communications by the mobile station 12 with any of the network infrastructure, 14, 16 and 18.

That is to say, the radio circuitry is of a construction to permit AMPS-based communications at the 800 MHz range, CDMA communications at 800 MHz range and PCS-based, CDMA communications at the 1.9 GHz range.

Here, the radio circuitry is divided into base band parts and RF (radio frequency) parts. The base band parts include an AMPS (advanced mobile phone service) part 34, a digital-cellular part 36, and a digital PCS part 38. The parts 34, 36, and 38 are coupled to a data source and data sink 42. The data source and data sink forms the source at which data to be transmitted by the mobile station is sourced and the data sink to which data received at the mobile station is provided.

The RF part of the mobile station is here shown to include an 800 MHz part 44 and a 1.9 GHz part 46. The 800 MHz part is coupled to the base band parts 34 and 36. And, the 1.9 GHz part 46 is coupled to the base band part 38. The various parts of the radio circuitry of the mobile station are variously operable to effectuate communications pursuant to the communication service through which the communications are effectuated.

The RF parts 44 and 46 of the radio circuitry are coupled to a switch assembly 50 of an embodiment of the present invention. The switch assembly is also coupled to transducer ports 52, 54, and 56. A first antenna transducer 62, here a whip antenna, is positioned at the first transducer port 52. A second antenna transducer 64, here a patch antenna, is positioned at the second transducer port 54. And, the transducer port 56 here forming a RF (radio frequency) coupler, permitting connection of the mobile station to an external device 66. The external device 66 is representative of testing apparatus or apparatus connecting the mobile station to an external antenna transducer, such as an automotive antenna.

The switch assembly is constructed pursuant to an embodiment of the present invention, responsive to input commands generated on the lines 72 and 74 by a mobile station control processor 76. The control commands generated on the line 72 and 74 position switch elements of the switch assembly 50 to selectably interconnect any of the transducer ports 52, 54, and 56 to any of the RF parts 44 and 46. Any of the desired combinations of connections between the antenna transducer ports and the RF parts of the radio circuitry are effectuable pursuant to the states defined by values of the control commands generated on the line 72 and 74. In other implementations, other numbers of control lines can be utilized.

A load element 78 is further shown in the figure to be connected to the switch assembly 50. In operation of an embodiment of the present invention, the load element is selectably coupled to a transducer port to reduce RF coupling between transducers connected to the radio circuitry of the mobile station by the switch assembly.

Figure 2:
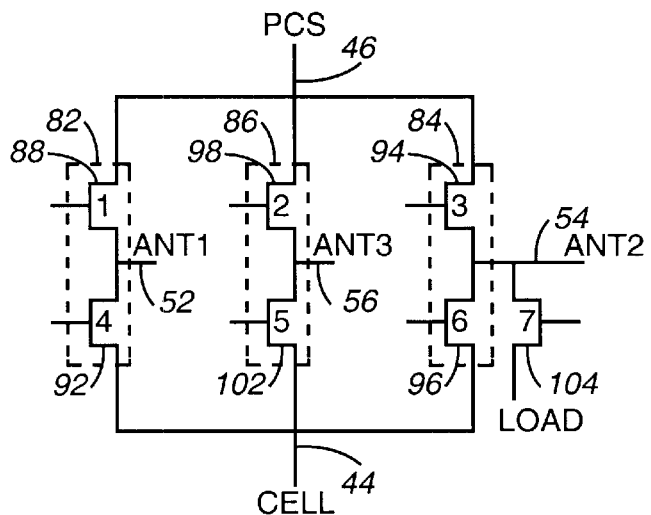
FIG. 2 illustrates a partial circuit schematic, partial functional block diagram, of portions of the switch assembly forming a portion of the mobile station shown in FIG. 1.

FIG. 2 illustrates portions of the switch assembly 50 of an embodiment of the present invention. Here, the switch assembly is shown to include several switch element sets, here, a first switch element set 82, a second switch element set 84, and a third switch element set 86. The first transducer port 52 is positioned between first and second switch elements 88 and 92 of the first switch element set. Analogously, the transducer port 54 is positioned between first and second switch elements 94 and 96 of the second switch element set. And, the port 56 is positioned between first and second switch elements 98 and 102 of the third switch element set 86. Additionally, a shunt switch element 104 is positioned between the transducer port 54 and the load element 78.

First sides of the first switch element 88, 94 and 98 are coupled to the RF part 46. And, first sides of the switch elements 92, 96 and 102 are coupled to the RF part 44.

In one exemplary implementation, and as shown in the figure, the switch elements of the switch element sets 82, 84 and 86 as well as also the shunt element 104 are formed of gallium arscenide (GaAs) semiconductor transistor switches. In another implementation, the switch elements form MEM switches. By selectably biasing selected ones of the switch elements, any of the transducer ports, and antenna transducers connected thereto, are connectable to the RF parts 44 and 46.

Figure 3:
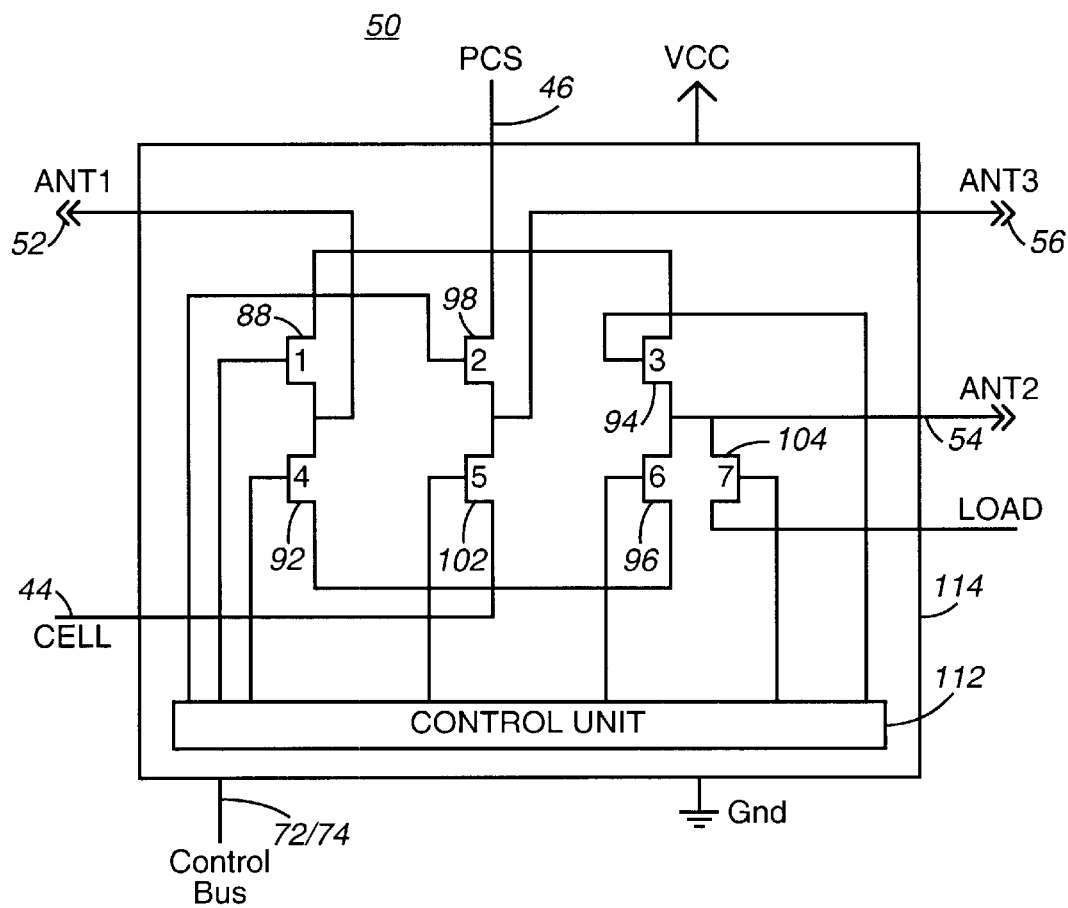
FIG. 3 illustrates a partial circuit schematic, partial functional block diagram, of the switch assembly of an embodiment of the present invention.

FIG. 3 again illustrates the switch assembly 50 of an embodiment of the present invention, again illustrating the switch elements 88 and 92, 94 and 96, 98 and 102, and 104. Connections of first sides of the elements 88, 94, and 98 are then shown to be coupled to the line 47 extending to the RF part 46. And, first side of the switch elements 92, 96 and 102 are shown to be coupled by way of the line 45 to the RF part 44. Here, each of the switch elements is shown to be coupled to a control unit 112, and the control unit 112 together with the switch elements are embodied at a common substrate 114, here to form a single integrated circuit device. The control unit is coupled to the lines 72 and 74 to receive control inputs generated thereon by the mobile station controller 76 (shown in FIG. 1). The control unit 112 is thereby operable to control the switch position of the switch element of the switch assembly.

A table, shown generally at 116, illustrates exemplary connections effectuated by the switch elements of the switch assembly. Here, four states are defined depending upon the values generated on the lines 72 and 74, here line 1 and line 2, respectively. When line 1 is of a logical zero value, the mobile station is to be operated in the PCS frequency band without any external connection to the coupler 56. Alternately, when the line 74 is of the zero value, the mobile station is to be operated in a cellular band together with connection to the external apparatus by way of the port 56.

When the line 74 is of a logical one value, the mobile station is to be operated in the cellular-band frequency without connection of the external apparatus at the port 56. Or, the mobile station is to be operated at the PCS band, together with connection of the external apparatus at the port 56.

When the line 74 is of a logical zero value, the whip antenna 62 is in an extracted position, and when the line 74 is of a logical one value, the whip antenna is in a retracted position.

The antenna transducers are thereby caused to be connected to respective ones of the parts of the radio circuitry, in manners indicated in the table, responsive to the values generated on the lines 72 and 74. In other implementations, other arrangements are, of course, possible.

Figures 4, 5:
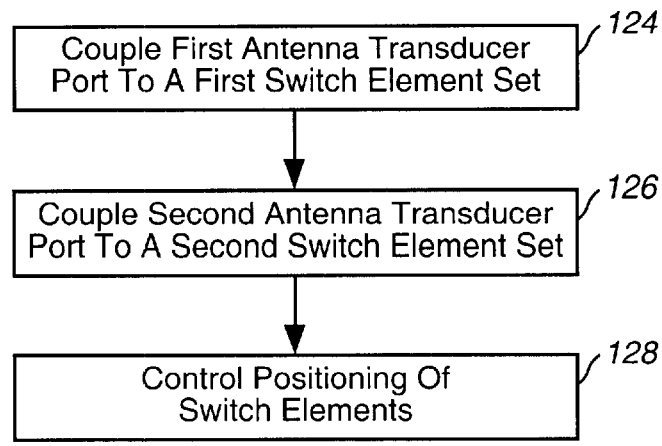
FIG. 4 illustrates a table exemplary of the logical values applied to the switch assembly and corresponding switch positions of the switch elements thereof during operation of an exemplary implementation of the present invention.
FIG. 5 illustrates a method flow diagram listing the method of operation of an embodiment of the present invention.

FIG. 5 illustrates a method flow diagram, shown generally at 122 representative of the method of operation of an embodiment of the present invention by which to switchingly connect a selected one of a first antenna transducer port and at least a second antenna transducer port with a selected one of a first circuit and a second circuit. First, and as indicated by the block 124, the first antenna transducer port is coupled to a first switch element set, which, in turn, is connected to the first circuitry and the second circuitry. Then, and as indicated by the block 126, the second antenna transducer port is coupled to a second switch element set. And, in turn, the second switch element set is connected to the first circuitry and the second circuitry.

Then, and as indicated by the block 128, positioning of the first and second switch element sets are controlled, selectably to cause connection of the first antenna transducer port and the second antenna transducer port with the first and second circuitry.

Thereby, a manner is provided by which to selectably connect a selected antenna transducer, such as a whip antenna or a patch antenna, to selected portions of the radio circuitry of a multi-mode mobile station, or other communication station.

The previous descriptions are of preferred examples for implementing the invention, and the scope of the invention should not necessarily be limited by this description. The scope of the present invention is defined by the following claims.

We claim:

1. In a communication station having first circuitry operable to communicate pursuant to a first communication system and at least second circuitry operable to communicate pursuant to a second communication system, an improvement of switch assembly for switchingly connecting a selected one of a first antenna transducer port, a second antenna transducer port and at least a third antenna transducer port with a selected one of the first circuitry, and at least second circuitry, said switch assembly comprising:

a first switch element set coupled to the first antenna transducer port, to the first circuitry and to the second circuitry, said first switch element set selectably operable to connect the first antenna transducer port to a selected one, if any, of the first circuitry and the at least second circuitry;

a second switch element set coupled to the second antenna transducer port, to the first circuitry, and to the at least the second circuitry, said second switch element set selectably operable to connect the second antenna transducer port to a selected one, if any, of the first circuitry and the at least second circuitry, a third switch element set coupled to the third antenna transducer port, to the first circuitry, said third witch clement set selectably operable to connect the third antenna transducer port to a selected one, if any, of the first circuitry and the at least second circuitry, and a controller coupled to said first switch element set and to said second switch element set, and controller for controlling positioning of said switch slant set and said second switch element set.

2. The switch assembly of claim 1 wherein said first switch element set comprises a first first-set switch element positioned between the first circuitry and the first antenna transducer port and a second first-set switch element positioned between the second circuitry and the first antenna transducer port, the first first-set switch element positioned alternately in a closed position to electrically connect the first antenna transducer port with the first circuitry and in an open position to electrically isolate the first antenna transducer port from the first circuitry, and the second first-set switch element positionable alternately in a closed position to electrically connect the first antenna transducer port with the second circuitry, and in an open position to electrically isolate the first antenna transducer port from the second circuitry.

3. The switch assembly of claim 2 wherein said controller is operable to control positioning of the first first-set switch element in a selected one of the open position and the closed position and to control positioning of the second first-set switch element in a selected one of the open position and the closed position.

4. The switch assembly of claim 3 wherein said controller selectably causes positioning of the first first-set switch element in the open position and the second first-set switch element in the closed position, positioning of the first first-set switch element in the closed position and the second first-set switch element in the open position, and positioning of both the first and second first-set switch elements, respectively, in the open positions.

5. The switch assembly of claim 4 wherein said controller further prohibits positioning of both the first and second first-set switch elements simultaneously in the closed positions.

6. The switch assembly of claim 3 wherein the first and second first-set switch elements comprise transistor switches.

7. The switch assembly of claim 3 wherein the first and second first-set switch elements comprise MEM switches.

8. The switch assembly of claim 1 wherein said second switch element set comprises a first second-set switch element positioned between the first circuitry and the second antenna transducer port and a second second-set switch element positioned between the second circuitry and the second antenna transducer port, the first second-set switch element positionable alternately in a closed position to electrically connect the second antenna transducer part with the first circuitry and in an open position to electrically isolate the second antenna transducer port from the first circuitry, and the second second-set switch element positionable alternately in a closed position to electrically connect the first the second antenna transducer port with the second circuitry and in an open position to electrically isolate the second antenna transducer port from the second circuitry.

9. The switch assembly of claim 8 wherein said controller is operable to control positioning of the first second-set switch element in a selected one of the open position and the closed position and to control positioning of the second second-set switch element in a selected one of the open position and the closed position.

10. The switch assembly of claim 9 wherein said controller selectably causes positioning of the first second-set switch element in the open position and the second second-set switch element in the closed position, positioning of the first second-set switch element in the closed position and the second second-set switch element in the open position, and positioning of both the first and second second-set switch elements, respectively, in the open positions.

11. The switch assembly of claim 1 wherein said third switch element set comprises a first third-set switch element positioned between the first circuitry and the third antenna transducer port and a second third-set switch element positioned between the second circuitry and the third antenna transducer port, the first third-set switch element positionable alternately in a closed position to electrically connect the third antenna transducer port with the first circuitry and in an open position to electrically isolate the third antenna transducer port from the first circuitry and the second third-set switch element positionable alternately in a closed position to electrically connect the third antenna transducer port with the second circuitry and in an open position to electrically isolate the third antenna transducer port from the second circuitry.

12. The switch assembly of claim 11 wherein said controller is operable to control positioning of the first third-set switch element in a selected one of the open position and the closed position and to control positioning of the second third-set switch element in a selected one of the open position and the closed position.

13. The switch assembly of claim 11 wherein the communication station further comprises a load element and wherein said electronic switch assembly further comprises a shunt switch element positioned between the second antenna transducer port and the load element, said shunt switch element selectably positionable in an open position and in a closed position.

14. The switch assembly of claim 13 wherein said controller selectably causes positioning of said shunt switch element in the closed position when said first antenna switch element is positioned to connect the first antenna transducer port with the first circuitry.

15. The switch assembly of claim 13 wherein a whip antenna transducer is coupled to the first antenna transducer port, the whip antenna transducer translatable between a retracted position and an extracted position, wherein a patch antenna transducer is coupled to the second antenna transducer port and wherein said controller controls positioning of said first switch element set and said second switch element set to connect a selected one of the first circuitry and the second circuitry with both the first antenna transducer port and the second antenna transducer port when the whip antenna transducer is in the extracted position.

16. The switch assembly of claim 15 wherein said controller controls positioning of said first switch element set and said second switch element set to connect the selected one of the first circuitry and the second circuitry with the second antenna transducer port and to prevent connection of the selected one of the first circuitry and the second circuitry with the first antenna transducer port when the first antenna transducer is positioned in the retracted position.

17. The switch assembly of claim 16 wherein said controller causes positioning of said shunt switch element in the closed position when said first switch element set connects the first antenna transducer port to either of the first circuitry and the second circuitry.

18. The switch assembly of claim 1 wherein said first switch element set, said second switch element set, and said controller are embodied at a common substrate.

* * * * *